(12) United States Patent
Mahlab et al.

(10) Patent No.: US 8,543,013 B2
(45) Date of Patent: Sep. 24, 2013

(54) TECHNIQUE FOR DETECTION OF OPTICAL DATA SIGNALS

(75) Inventors: Uri Mahlab, Or Yehuda (IL); Michael Gutin, Petach-Tikva (IL)

(73) Assignee: ECI Telecom Ltd., Petach Tikva (IL)

( * ) Notice: Subject to any disclaimer, the term of this patent is extended or adjusted under 35 U.S.C. 154(b) by 315 days.

(21) Appl. No.: 12/988,069

(22) PCT Filed: Apr. 5, 2009

(86) PCT No.: PCT/IL2009/000354
§ 371 (c)(1),
(2), (4) Date: Oct. 15, 2010

(87) PCT Pub. No.: WO2009/128059
PCT Pub. Date: Oct. 22, 2009

(65) Prior Publication Data
US 2011/0038642 A1 Feb. 17, 2011

(30) Foreign Application Priority Data
Apr. 15, 2008 (IL) .......................................... 190890

(51) Int. Cl.
*H04B 10/06* (2011.01)

(52) U.S. Cl.
USPC ........... 398/212; 398/202; 398/208; 398/214; 398/159; 398/158; 398/176; 398/180; 359/328; 359/326; 359/330; 372/22; 372/26

(58) Field of Classification Search
USPC ................ 398/202, 212, 214, 208, 209, 207, 398/135, 136, 137, 138, 164, 158, 159, 160, 398/79, 81, 85, 175, 176, 180; 359/328, 359/326, 332, 330; 372/22, 26, 32, 34, 38, 372/29, 27

See application file for complete search history.

(56) References Cited

U.S. PATENT DOCUMENTS

| | | | |
|---|---|---|---|
| 6,233,260 B1 * | 5/2001 | Makio et al. | 372/22 |
| 6,785,471 B2 | 8/2004 | Lee et al. | |
| 6,856,451 B2 * | 2/2005 | Oikawa et al. | 359/328 |
| 2002/0141041 A1 | 10/2002 | Payne et al. | |
| 2003/0026573 A1 | 2/2003 | Mizuuchi et al. | |
| 2003/0086713 A1 * | 5/2003 | Inui et al. | 398/199 |
| 2005/0105919 A1 | 5/2005 | Sugihara et al. | |
| 2005/0226640 A1 | 10/2005 | Audic et al. | |
| 2006/0045148 A1 | 3/2006 | Zhang et al. | |
| 2009/0213886 A1 * | 8/2009 | Fujii et al. | 372/38.07 |

FOREIGN PATENT DOCUMENTS

| | | |
|---|---|---|
| EP | 1 231 725 A | 8/2002 |
| WO | WO 0049458 A1 | 8/2000 |

OTHER PUBLICATIONS

Bin Ni, et al. "Performance of Nonlinear Receivers in Asynchronous Spectral-Phase-Encoding Optical CDMA Systems", Journal of Lightwave Technology, Aug. 1, 2007, pp. 2069-2080, vol. 25, No. 8, IEEE Service Center, New York, New York.

* cited by examiner

*Primary Examiner* — Hanh Phan
(74) *Attorney, Agent, or Firm* — Browdy and Neimark, PLLC

(57) ABSTRACT

Technology for detecting an optical data signal carried in a combined optical signal that comprises a carrier optical signal modulated by the optical data signal and also comprises ASE noise. The proposed optical data detector/receiver is provided with an SHG device adapted to generate a second harmonic optical signal of the carrier optical signal modulated by the data signal. In the signal, generated by the SHG, the ASE noise will be essentially reduced.

6 Claims, 3 Drawing Sheets

TECHNIQUE FOR DETECTION OF OPTICAL DATA SIGNALS

FIELD OF THE INVENTION

The present invention relates to equipment for optical communication networks.

BACKGROUND OF THE INVENTION

A problem of noise suppression (i.e., improving Optical Signal to Noise Ratio OSNR) in long communication lines is a very complex problem, which always required great efforts and high investments at the transmitting end, at nodes of the communication line and at the receiving end. Today, there are no means that enable a network operator or designer to improve OSNR using passive components (i.e., those not comprising electro-optical schemes). For modern optical communication lines, which operate at very high bitrates, the problem becomes critical; the only way to improve OSNR in such systems is to regenerate the optical signal. A conventional signal regeneration assembly comprises expensive active blocks such as an optical receiver (Rx), an Opto-Elecro-Optic regeneration block and an optical transmitter (Tx). The regeneration cost today is approximately $10 k for an optical channel transmitting signals at 10 Gb/s, the regeneration cost jumps to $30~50 K for the bit rate 40 Gb/s per channel. Moreover, new high bit rate systems operating at 100 Gb/s are being presently developed and are on their way to the market. In some cases the regeneration is impossible for several reasons (for example in underwater communication links and the like). For such cases, there is no solution to efficiently overcome the problem by now.

Second Harmonic Generation devices (comprising SHG or non-linear crystals) are known in the prior art, and are usually utilized as components in lasers. The SHG property of converting an optical beam having a fundamental wavelength into a light beam having a twice-shorter (second harmonic) wavelength, where frequency noise of the source is reduced, is widely utilized for producing coherent light in lasers.

US 2006045148 describes a low noise, intra-cavity frequency doubling micro chip laser utilizing a non-linear crystal.

SHG devices are also used in combination with lasers, for example US2003/0007205 (U.S. Pat. No. 6,785,471) describes an optical sampling technique. The probe pulse source is frequency-doubled e.g., using a frequency doubler such as a nonlinear PPLN (Periodically Poled Lithium Niobate) crystal, to obtain an intermediate second harmonic, which may be filtered with a 780 nm bandpass filter to eliminate at least the source frequency noise background. The filtered intermediate second harmonic is then mixed with the user input signal by utilizing an optional polarizing beam splitter and a dichroic beam splitter. The mixed signal is sent to a sum frequency generating (SFG) nonlinear crystal, e.g., a PPLN crystal, where the resulting frequency is near the third harmonic. The output from the SFG PPLN crystal may be filtered using a bandpass 515 nm filter to remove unwanted wavelengths, and then processed to measure/sense the near third harmonic content using a photomultiplier tube (PMT).

US2003026573A describes yet another, specific design of a waveguide device incorporating an SHG element, the waveguide is intended to be used with a laser and enables reducing the following types of noise: low frequency interference noise and mode hopping noise. The low frequency interference noise occurs when light emitted from a so-called SHG blue light source (formed by the SHG element) is reflected and returns to the exit end face of the SHG blue light source to cause interference in the optical system outside the SHG blue light source. The mode hopping noise results from the inside of the laser.

To the best of the Applicant's knowledge, SHG elements have always been used for reducing specific types of noise created in the transmitter/laser systems, so as to obtain maximally clean coherent signals suitable, for example, for transmission via communication lines over long distances.

OBJECT AND SUMMARY OF THE INVENTION

The Inventors have noted that by now, nobody in the prior art has proposed using an SHG device for reduction/elimination of ASE noise created upon transmitting signals over long optical communication lines.

The SHG (Second Harmonic Generating) device should be understood as a device comprising, for example, a non-linear SHG crystal or fiber.

The ASE noise (Amplifiers Spontaneous Emission noise) is the non-coherent noise created by optical amplifiers. For the sake of simplicity, non-coherent noise can be represented as a plurality of signals carried at different wavelengths, which cannot produce so-called coherent interference where they add constructively or subtract destructively. The ASE noise is one of the main impairments created in any optical communication line, together with chromatic dispersion and non-linearity. Any optical communication line (an optical fiber, a free space line) comprising optical amplifiers will inevitably accumulate the ASE noise. Long optical communication lines cannot exist without amplifiers; however, the prior art does not comprise an indication that ASE noise, which is always present in an optical signal carried via an optical line, can be reduced or eliminated in a manner different than regeneration of the signal.

It is the object of the present invention to provide a technique for detecting data carried by an optical signal transmitted via an optical communication line, which would be able to essentially reduce ASE noise accumulated during transmission of the optical signal without performing regeneration of the signal—i.e., a technique suitable even in cases when regeneration of optical signals in the line is problematic or impossible.

The Inventors wish it to be noted that though data, carried over optical channels by a specific optical carrier wavelength, has to be detected/received at a point of interest (say, a monitoring point, a receiver, etc.), the data does not have to be detected at that same optical carrier wavelength at which it was transmitted. This, however, was never used for reducing noise accumulated in optical signals transferred via an optical line.

According to a first aspect of the invention, the object can be achieved by providing a method for reducing Amplifiers Spontaneous Emission (ASE) noise in optical signals upon having been transferred over an optical communication line; the method comprises applying, at a point of interest, an optical carrier signal modulated by an optical data signal to an SHG (Second Harmonic Generating) device, and thereupon ensuring detection of said optical data signal now carried by a second harmonic optical carrier signal generated in the SHG device, wherein the ASE noise being essentially suppressed by the SHG device.

More particularly, there is proposed a method for reducing Amplifiers Spontaneous Emission (ASE) noise in optical data signals upon being transferred via an optical communication line comprising at least one optical amplifier, the method comprising:

applying to a Second Harmonic Generating (SHG) device a combined optical signal comprising at least an optical carrier signal modulated by the optical data signal and also comprising ASE noise accumulated while transferring the modulated optical carrier signal via the optical communication line;

obtaining a second harmonic optical signal generated by said SHG device from said combined optical signal, wherein in said second harmonic optical signal the ASE noise is essentially reduced while said optical data signal is preserved, detecting said optical data signal being essentially free (cleaned) from the ASE noise.

By the present moment, nobody has suggested using the SHG generation at an optical detector/receiver/monitoring point for reducing the ASE noise at the point of interest and thus obtaining a high OSNR (Optical Signal-to-Noise Ratio) data signal.

According to a second aspect of the invention, the object can be achieved by providing an optical data detector, for detecting an optical data signal carried in a combined optical signal comprising a carrier wavelength optical signal modulated by an optical data signal, and also comprising ASE noise (usually generated by one or more optical amplifiers in the optical line via which the signal is transferred);

the optical data detector being provided with an SHG device capable of generating a second harmonic optical signal comprising a second harmonic of said carrier optical signal, modulated by said optical data signal, wherein said ASE noise being essentially reduced in the generated second harmonic optical signal.

The invention thereby allows providing a device enabling detection of the optical data signal with a high optical signal to noise ratio (OSNR), since the ASE noise, accumulated in the combined optical signal, is essentially reduced or almost suppressed in the second harmonic optical signal generated by the SHG device.

The optical data signal modulating the optical carrier signal can be either a Return-to-Zero (RZ) data signal or a Non-Return-to Zero (NRZ) data signal.

It has been found by the Inventors that, while the ASE noise accumulated in the carrier wavelength signal modulated by the data signal is almost totally suppressed when converting the carrier optical wavelength into the second harmonic wavelength, the data signal—even at very high bit rates— passes the SHG device almost transparently, i.e. almost without changes. The data signal appears to be a signal modulating the second harmonic carrier and can be then safely extracted from the second harmonic optical signal.

Apparently, an SHG device does not convert data signals into one or more second harmonics thereof since frequency of any high bit rate data signal is too much lower than frequency of any accepted optical carrier signal (which is perceivable by the SHG device as a fundamental harmonic and convertible into the corresponding second harmonic). The above phenomenon actually serves evidence that, by using SHG devices at detectors/receivers of optical data, we obtain practically an unlimited perspective to increase the data bit rate while keeping the high OSNR at the detector and the constant cost of the detector.

The power of a second harmonic signal, generated from the combined optical signal by an SHG crystal (being the base of the SHG element), can be written down using the following equation [1]. In other words, the power of a second harmonic signal is proportional to a product of the squared power of an incident first (fundamental) harmonic signal from which the second harmonic signal is generated, and also proportional to an exponential function that depends on the SHG crystal's length and the coherence length $L_{coh}$ of the incident first harmonic signal:

$$P_2 \propto P_1^2 \exp[-(z/L_{coh})^2] \qquad [1]$$

Where:

$L_{coh}=2/(d_{12}\delta\omega)$ is the coherent length of the incident first (fundamental) harmonic light;

The coherence length $L_{coh}$ is defined as the distance the wave travels in time up to the phase thereof wanders by a significant amount.

$d_{12}$ is a coefficient, called the walk-off parameter, $\delta\omega$ is a parameter called the half width of the fundamental signal (i.e., the half width of the Gaussian distribution of component wavelengths in the considered fundamental signal), and Z is the length of the SHG crystal in the SHG device.

As one can see, the power of the generated second harmonic is proportional to the power of the incident fundamental harmonic and depends strongly on the fundamental harmonic's half width.

Since the Gaussian distribution of the component non-coherent wavelengths is very wide in the ASE noise signals, while it is narrow in coherent signals of optical carrier wavelengths, $L_{coh}$ for ASE noise is much shorter than $L_{coh}$ for optical carrier wavelength signals (to be more specific, of about 300 times shorter).

In optical communications, the power of a data signal transmitted by a carrier signal via an optical line is much higher that the power of ASE generated in the optical line: $P_1^{signal} >> P_1^{noise}$;

Since the coherent length $L_{coh}$ of the ASE noise is significantly shorter that that of the carrier wavelength signal (modulated by the data signal), we can obtain that power $P_2$ of the second harmonic signal generated by the noise is negligible when compared to the second harmonic signal generated by the data signal (i.e., by the carrier wavelength modulated by the data signal): $P_2^{signal} >> P_2^{noise}$.

One can see from the above relations that, for a specific constant value of Z being the length of the SHG crystal used in the described device, the data signal carried by the second harmonic signal can be considered as a replica of the original data signal, since the power $P_2$ of the obtained data signal is proportional to the squared power of the original data signal.

In a specific embodiment, the proposed data detector is connectable to a communication line (via an optical connector) and further comprises:

an input collimation lens for introducing the incoming combined optical signal into the SHG device (comprising an SHG crystal);

a filter (such as a short pass color filter) for passing therethrough only the second harmonic optical signal, thereby separating it from the partially remaining fundamental harmonic optical signal and thus obtaining the generated second harmonic optical signal from the SHG device;

a collimation lens for introducing the generated second harmonic optical signal to an optical fiber;

a photo diode connected to the optical fiber, for converting the generated second harmonic optical signal into an electrical signal.

Preferably, the proposed optical data detector forms part of an optical data receiver. Alternatively, the detector may be part of a data monitor placed in a middle portion of an optical line and intended for monitoring data signals without affecting the traffic. The optical receiver/monitor may then comprise additional means for extracting the data signal from the converted electrical signal.

The proposed technique saves considerable investments for improving OSNR in the communication line (especially considerable when high bit rate data is transmitted), because the proposed technique is "passive" (uses passive elements) and bit rate independent.

In cases where no signal regeneration is possible, the proposed solution simply becomes the enabling technology (i.e., the only one possible technology that enables functioning of the system).

BRIEF DESCRIPTION OF THE DRAWINGS

The present invention will be further described and illustrated with reference to the following non-limiting drawings, in which.

DETAILED DESCRIPTION OF THE INVENTION

Figure 1:
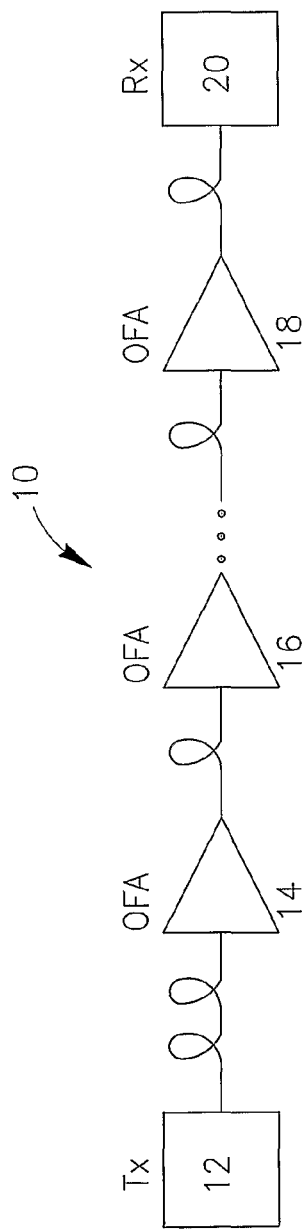
FIG. 1 (prior art) schematically illustrates an example of a conventional arrangement of an optical communication line.

FIG. 1 (prior art) schematically shows an optical communication line 10 equipped with conventional means 14, 16, 18 for amplifying the optical data signal carried via one exemplary optical channel between a transmitter 12 and a receiver 20. The conventional means should be understood as Optical Fiber Amplifiers OFA which, while amplifying the optical signal, amplify also the accumulated noise signal and thus lead to degradation of OSNR (Optical Signal to Noise Ratio) being the main characteristic of optical signals' transmission. In this particular figure one exemplary optical channel is illustrated.

Figure 2:
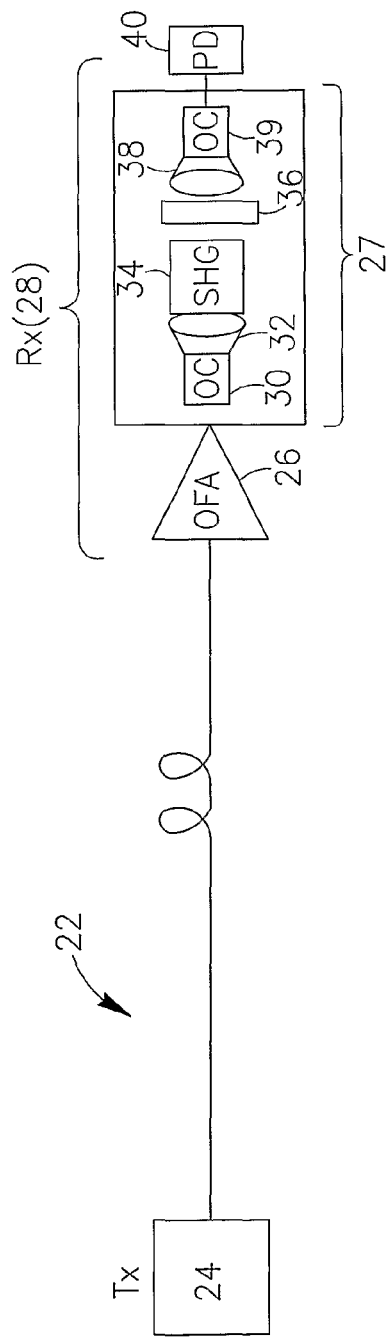
FIG. 2. schematically illustrates one embodiment of the proposed inventive receiver/detector of data signal in optical communication lines.

FIG. 2 shows an optical line 22 arranged according to the proposed invention. The line 22, for the purpose of example only, comprises an optical transmitter 24 for transmitting data via one optical channel, and does not require at all (or require much less) OFAs and/or optical signal regenerators (not shown) than the conventional line 10, since the line is provided with a novel data detector 27 incorporated in an optical receiver 28. The receiver 28 still comprises an input amplifier OFA 26 for pre-amplifying the incoming combined signal comprising a carrier wavelength signal modulated by the data signal to be detected, and the ASE noise which is usually accumulated in the signal transmitted via the optical line. The amplified combined signal, via an optical connector 30, is applied to an input collimation lens 32 and then onto an SHG element 34. The SHG element generates a second harmonic signal, which passes via the short pass color filter 36, still carrying the data signal thereon, but being almost free from noise accumulated during the transmission. The second harmonic signal then passes via an output collimation lens 38 and, by a connector 39 is further fed to a photo detector 40, which converts the optical signal into an electrical signal. Since the ASE noise is almost fully suppressed by the SHG element, the receiver is a low noise one. The clean data signal may be then extracted by some additional electrical means (not shown).

It should be noted that the solution illustrated in FIG. 2 is for a sole optical channel; the optical fiber of the communication line shown in FIG. 2 may be understood as one of the fibers serving one of a plurality of optical channels transmitted along a preceding communication line and obtained upon demultiplexing of the combined optical signal.

Figure 3A:
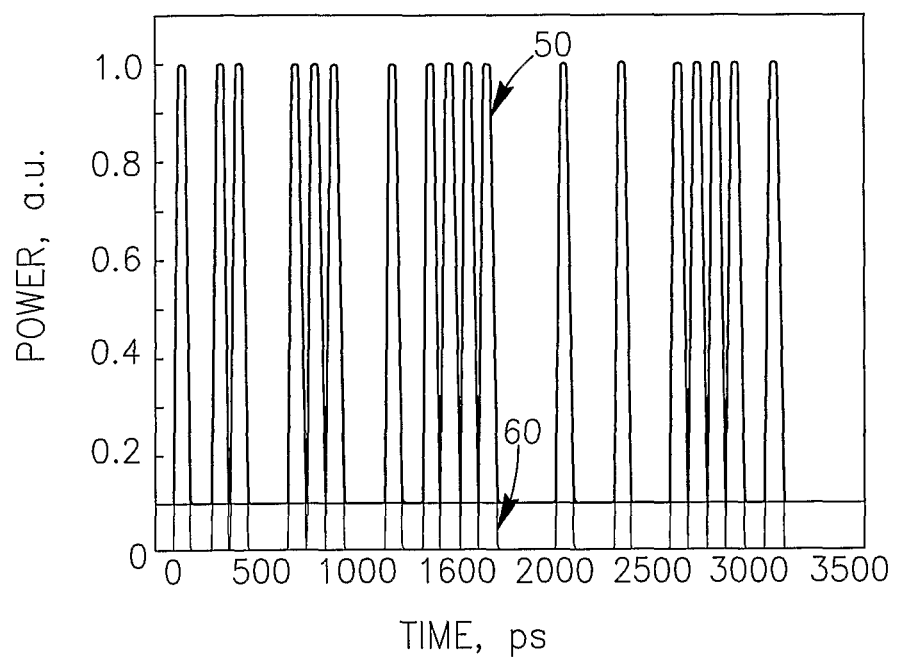
FIGS. 3a, 3b and 3c schematically illustrate a second harmonic signal generated in the SHG device of the optical detector from the incident (original) carrier optical signal modulated by a data optical signal.

FIGS. 3a illustrates simulations of:
the original data signal (a solid line 50) received at the input of the proposed optical detector, and
the generated data signal (a thin line 60) obtained at the output of the SHG device of the proposed optical detector.

Figure 3B:
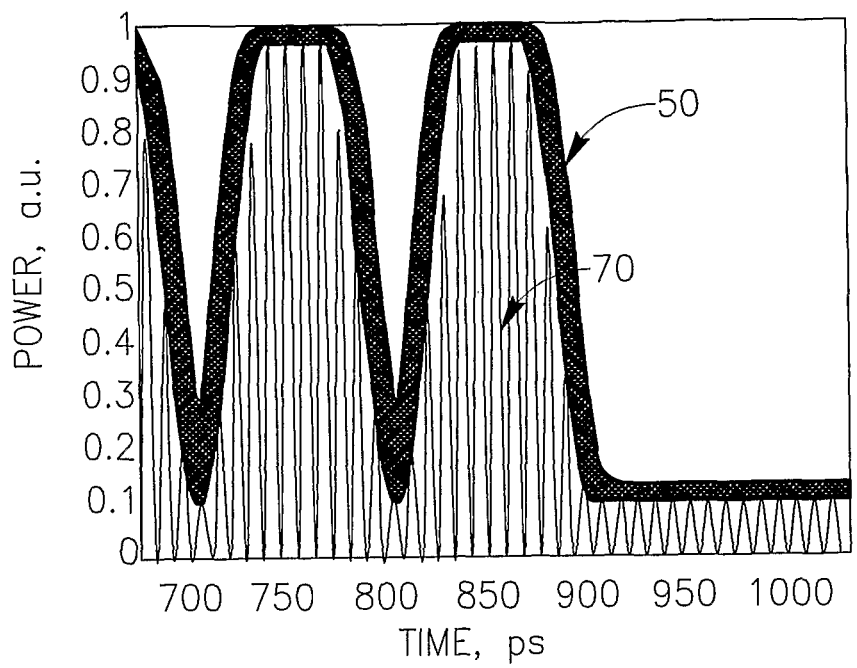
Figure 3C:
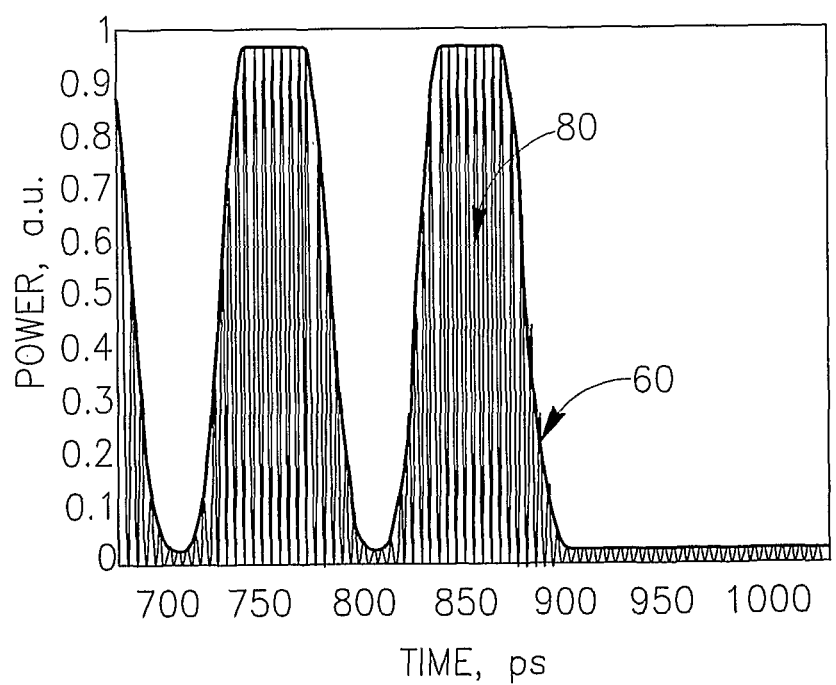

The vertical axis is presented by arbitrary power units, the horizontal axis is time in picoseconds; the example of FIGS. 3a-3c is drawn for a data signal having the bit rate of 10 Gbit per second.

Parameters of the SHG element (for example, length of the crystal) can be preliminarily selected, or be adjustable to ensure the best possible mode of operation, i.e., from the point of suppressing ASE noise and from the point of transparently copying the data signal.

FIGS. 3b and 3c present each an enlarged portion of FIG. 3a for the original data signal and for the generated data signal respectively.

FIG. 3b shows a simulation of the original data signal, which is a modulating signal 50 carried by the original (first harmonic) carrier wavelength signal 70. The modulating signal 50 is shown as a thick dark line, hazy due to presence of the ASE noise. The first harmonic carrier wavelength signal 70 is most schematically shown as a high frequency optical wave "filling" the pulses of the original data signal 50 (it should be kept in mind that the high frequency carrier signal cannot be seen in the drawing if shown in real proportional scale).

FIG. 3c shows a simulation of the data signal 60 "generated" by the SHG device; signal 60 is a modulating signal carried by the second harmonic carrier wavelength signal 80 generated by the SHG crystal. The data signal 60 shown as a contrast enveloping line, since it is practically free from the ASE noise. The second harmonic carrier wavelength signal 80 is shown (just schematically, since it cannot be seen in the scale proportional to the scale of the data signal) as an optical wave having the doubled frequency in comparison with signal 70 of FIG. 3b and filling the pulses of the "generated" data signal 60.

Despite the fact that the data signal 60, generated by the SHG crystal, may be slightly distorted in comparison with the original data signal 50, it is obvious that the generated data signal is a replica (a copy) of the incident data signal and that it can easily be detected by the proposed optical detector and further extracted by a receiver comprising such a detector.

The estimated total cost of the low noise data detector per channel is quite moderate: of about $3,365 (Collimation lens $160 each; Short pass color filter $45, Non-linear Crystal for SHG element is of about 3,000). It should be kept in mind that the detector is fully optical and bit rate independent, i.e. both its operation and its cost do not depend on the data signal bit rate.

Taking into account that:
a) There are no means today that enable improving OSNR by passive components. The only way to do it is regeneration of the signal. The cost of a conventional signal regeneration assembly for one optical channel is very high. For example, the regeneration cost today is approximately 10 k for a 10 Gb/s per channel and is expected to be 30~50 K for a 40 Gb/s per channel.
b) In some cases the regeneration is impossible for some reasons (for example in sub-marine links).

In view of the above, the proposed inventive technique is the only way to overcome the long felt and still deepening problem of OSNR improvement in optical communication systems, especially at the points where the optical data signal is to be received upon being transmitted over long optical lines. The proposed technique saves investments, especially for high bit rate systems, because the proposed structure of optical detectors/monitors/receivers is passive and bit rate independent. Moreover, in some special applications the proposed technique becomes just an enabling technology.

It will be appreciated by a person skilled in the art that the present invention is not limited by what has thus far been described with respect to specific embodiments. Rather, the present invention is limited only by the claims, which follow. When used in the following claims, the terms "comprises", "comprising", "includes", "including" or the like mean "including but not limited to".

The invention claimed is:

1. A method for reducing Amplifiers Spontaneous Emission (ASE) noise in optical signals upon being transferred via an optical communication line, the method comprising:

applying, to a Second Harmonic Generating (SHG) device, a combined optical signal comprising at least an optical carrier signal modulated by an optical data signal and also comprising ASE noise accumulated while transferring the modulated optical carrier signal via the optical communication line;

obtaining a second harmonic optical signal generated by said SHG device from said combined optical signal, wherein in said second harmonic optical signal the ASE noise is essentially reduced while said optical data signal is preserved, and detecting from said second harmonic optical signal, said optical data signal being essentially cleaned from the ASE noise.

2. The method according to claim 1, wherein the step of detecting is performed at a data receiving point.

3. An optical data detector, for detecting an optical data signal carried in a combined optical signal comprising a carrier optical signal modulated by the optical data signal and also comprising ASE noise; the optical data detector being provided with an SHG device capable of generating a second harmonic optical signal comprising a second harmonic of said carrier optical signal modulated by said optical data signal, wherein said ASE noise being essentially reduced in the generated second harmonic optical signal.

4. The optical data detector according to claim 3, further comprising: an input collimation lens for introducing the combined optical signal into the SHG device; a filter for passing there-through only the second harmonic optical signal generated by the SHG device; a collimation lens for introducing the generated second harmonic optical signal to an optical fiber; a photo diode connected to the optical fiber, for converting the generated second harmonic optical signal into an electrical signal.

5. An optical data receiver, incorporating the optical data detector according to claim 3.

6. The optical data receiver according to claim 5, further comprising means for extracting the data signal from the converted electrical signal.

* * * * *